United States Patent Office 3,412,095
Patented Nov. 19, 1968

3,412,095
CHLORINATION OF ALKYL PYRIDINES
Nicholas Rex Clark, Weeping Cross, Stafford, England, assignor to Midland-Yorkshire Tar Distillers Limited
No Drawing. Filed July 28, 1965, Ser. No. 475,558
Claims priority, application Great Britain, Aug. 5, 1964, 31,851/64
8 Claims. (Cl. 260—290)

ABSTRACT OF THE DISCLOSURE

A process for chlorinating alkyl pyridines and alkyl quinolines such that the chlorine is contained only in the alkyl side chain by reacting an alkyl pyridine or alkyl quinoline in the vapor phase with gaseous chlorine at an elevated temperature in the presence of an inert diluent such that the contact time of the reactants and products at the elevated temperature does not exceed sixty seconds.

---

Alkyl pyridines or alkyl quinolines chlorinated in the side chain are useful intermediates in organic syntheses and can take part in a wide variety of reactions. However there is considerable difficulty in preparing specific chlorinated-alkyl pyridines or chlorinated-alkyl quinolines in a pure state; not only is there the initial problem in a direct chlorination process of ensuring that all the chlorine is in the side-chain, but also there is the further problem of separating mono-, di- and higher chlorinated alkyl derivatives from each other.

Various direct chlorination processes of alkyl pyridines and alkyl quinolines are known. For example it is known to chlorinate 2-methyl pyridine or 2-methyl quinoline with gaseous chlorine in an inert solvent, at a temperature in the range of from 40 to 80° C. in the presence of an agent for binding hydrochloric acid; this is essentially a liquid-phase reaction, and results in side-chain chlorination, but it is solely restricted to alkyl substituents in the 2-position on the heterocyclic nucleus.

Another process involves the reaction of chlorine and 2-methyl pyridine as its hydrochloride in the liquid phase to produce a mixture of nuclear and side-chain chlorination products.

Previously known processes for the preparation and sources of chlorinated-alkyl pyridines and uses for these products are described in the following publications:

W. Mathes et al., Angew. Chem. Int. Edit., vol. 2, pp. 144–149 (1963); British Patent No. 909,080; U.S. Patent No. 2,679,453; K. Winterfield et al., Arch. Pharmaz. Ber. deutsch. pharmaz. Ges. 289/61, 448 (1956) C. 1958, 3305; Overhoff et al., Rec. Trav. Chim. Pays-Bas, vol. 55, p. 293 (1936) C. 1937 I. 353; Matsumura, J. Chem. Soc. (Japan), vol. 74, p. 363 (1963); Hammick, J. Chem. Soc. (London), 1923, p. 2882; Dyson et al., J. Chem. Soc. (London) 1939 I. 781 C. II 1866; McBee et al., Ind. Eng. Chem., vol. 39, p. 389 (1947); Brown et al., J. Chem. Soc. (London) 1951, p. 1145; Mosher et al., J.A.C.S. 1951, vol. 53, p. 4925; Baker et al., J. Chem. Soc., 1958, p 3594; Jerchel et al., Chem. Ber., 1960, vol. 93, pp. 2966–70; Brown et al., J.A.C.S. 1951, vol. 73, p. 3308; Kyte et al., J.A.C.S. 1960, p. 4454; Osuch et al., J.A.C.S., 1956, vol 78, p. 1723; Tchitchibabin Bull, Soc. Chim. France, 1963, vol. 3, p. 1607.

A variety of utilities for chlorinated alkyl and aralkyl pyridines are further illustrated in the following prior art; U.S. Patent No. 2,679,453 describes the use of trichloromethyl pyridines in the control of undesired vegetation. Swiss Patents Nos. 326,012 and 326,362 describe the utility of 3- and 4-monochloromethyl pyridines as intermediates for the preparation of tropamides which exhibit strong spasmolytic properties. Hoyer in Chem. Ber. 1960, vol. 93 at pp. 2475–9 describes the utility of 2-, 3- and 4-mono-chloromethyl pyridine as intermediates in the preparation of valuable chelating agents. Carelli et al. in Farmaco Ed. Sci. 1960, vol. 15, p. 803 describes the utility of diamines prepared from monochloromethyl pyridines as local anaesthetics. Other utilities for various chlorinated alkyl pyridines are described in the following publications: Halliday et al., J. Pharm. Sci. 1964, vol. 53 (1), pp. 19–23; Carellit et al., Farmaco Ed. Sci., 1960, vol. 15 p. 797; Schulze, J. Prakt. Chem., 1962, vol. 19 (1–2) 91–100; Barlow et al., Brit J. Pharmacol. and Therap. 1962, vol. 18 (3), 510–42; U.S. Patent No. 2,848,-457; Neimann et al., J.A.C.S., 1942, vol. 64, p. 1619.

To date, however, no single process has been described in which an alkyl pyridine or an alkyl quinoline can be selectively chlorinated in the side-chain, irrespective of the position of the alkyl substituent in the heterocyclic nucleus.

I have discovered that it is possible to prepare chlorinated-alkyl pyridines or chlorinated-alkyl quinolines having substantially all the chlorine substituent located in the alkyl side-chain by the reaction of an alkyl pyridine or an alkyl quinoline in the vapour phase with gaseous chlorine at an elevated temperature in the presence of an inert diluent provided that the contact time of the reactants and products at the elevated temperature does not exceed 60 seconds. It is surprising that, under these conditions, there is almost completely side-chain chlorination to the exclusion of nuclear chlorination. The contact time is assumed to last from the time the reactants enter the heated reaction zone until the reactants and products leave the zone and are cooled below the minimum reaction temperature.

The term "alkyl" in this specification includes the alkyl part of an aralkyl group.

The reaction may be carried out by passing the reactants through a silica or other supply tube maintained at the desired temperature at such a rate that the desired residence time is achieved. Alternatively the reactor tube may be packed with some suitable inert material such as porcelain, coke, alumina or silicon carbide. A silica tube packed with coarse lumps of silicon carbide gives the best results of those packed tubes I have tested.

The actual elevated temperature to be used in a process for the preparation of any desired chlorinated-alkyl pyridine or quinoline depends on two factors, namely the proportion of the diluent and the area of the surface on which the products can condense. Broadly speaking, as the proportion of diluent is increased, so the reaction temperature may be increased. If the reactor is packed with an inert material for the purpose of controlling the distribution of heat, the surface area will be much larger than if the reactor is empty; the lowest temperature usable with such a packed reactor is somewhat higher than the temperature with the same reactor unpacked. Using a packed reactor I prefer to work between the temperatures of 180° C. and 350° C., since I have found that the reaction is difficult to control outside this range. Below about 180° C. I find that there is an increased proportion of the more highly chlorinated alkyl material in the product, and this can be explained by assuming that a considerable amount of chlorination is taking place in the liquid phase. At temperatures above the range quoted, the formation of by-products and pitch or carbon becomes excessive.

If I do not pack the reactor, and work, for example, by passing the reactants through a heated tube, I can work at a temperature as low as about 140° C., although the conversion to chlorinated material per pass is lower than at the higher temperatures. I have also found that I can work the process at higher temperatures than with a packed reactor; any tendency to form pitch and carbon may be counteracted by increasing the proportion of inert diluent to alkyl pyridine or alkyl quinoline.

My experience has shown that, for any monochloro alkyl heterocycle, there is a temperature at which the percentage yield passes through a maximum, for example about 350° C. for 2-monochloro-methyl pyridine. In general I prefer not to work at a temperature above 500° C.

With a packed reactor I prefer to work within the range 220–280° C. There is a narrower range of temperature within the range of 220–280° C. in which the chlorination of any given alkyl pyridine proceeds most successfully, but the reaction as a whole works very well between 220 and 280° C.

I have found that steam is a very satisfactory inert diluent. In order to obtain a reasonable yield of product, I have found that there should be at least 0.1 mole of diluent for each mole of alkyl heterocycle. Excessive dilution of the alkyl pyridine or alkyl quinoline before the chlorination is obviously undesirable because the process becomes less economically attractive. While it is possible to dilute with 25 or even as much as 30 moles of diluent for each mole of alkyl pyridine or of alkyl quinoline, we prefer not to operate the process with a ratio of diluent to alkyl heterocycle greater than 20:1. Other diluents inert to chlorine may be used such as carbon tetrachloride or nitrogen, but difficulties arise with these materials and I prefer to use steam. The optimum quantity of steam is not the same for all alkyl pyridines. The process can be carried out with 3-picoline very satisfactorily with 4 moles of steam per mol of the picoline, whereas, in general, the chlorination of 4-picoline goes best in the presence of about 18 to 20 moles of steam per mole of the picoline, although as little as 8 to 10 moles of steam per mole of picoline will give good results under certain conditions.

The chlorination process of the present invention is a vapour-phase process. It is therefore essential to carry out the process at a temperature at which all the reactants are gaseous. This means that if the ratio of steam to base is large the temperature at which the process is operated must be above the boiling point of the azeotrope formed by water and the alkyl heterocycle; if however the ratio of steam to base is small, the process must be operated at a temperature above the boiling point of the alkyl heterocycle itself. It is especially important to ensure that a sufficiently high temperature is used when working with an empty reactor.

The production of undesirable by-products is greatly reduced by restricting the time of contact of reactants and products at the elevated temperature. Production of tars or carbonaceous material is not serious if the contact time does not exceed 60 seconds. To avoid this production I prefer to operate the process with a considerably shorter contact time than this, no more than 6 seconds with a packed reactor, and 12 seconds with an empty reactor. In either case, the time should be at least 0.1 second, and generally should be at least 1 second, to achieve a suitable yield of product.

The proportion of chlorine to alkyl heterocycle used depends on a number of factors. At a given temperature, and fixed ratio of diluent to alkyl heterocycle, the yield of product will vary according to the amount of chlorine used. For example, if 2-methyl pyridine is diluted with steam in a molar ratio of 1:2 and reacted with various proportions of chlorine at a temperature between 240 and 270° C., the maximum yield of chlorinated-methyl pyridines is obtained when the molar ratio of chlorine to 2-methyl pyridine is slightly in excess of 1:1. The reaction product is composed of 64.5% of the monochloromethyl pyridine, 25.5% of the dichloro product and 10% of the trichloro product.

If the molar ratio of chlorine to 2-methyl pyridine is increased to 2:1, the total yield falls off, and the reaction product is composed of 57.5% monochloromethyl pyridine, 10.5% of the dichloro product and 32% of the trichloro product. Surprisingly, if the molar ratio of chlorine to 2-methyl pyridine is decreased to 0.5:1, the total yield falls, but the proportion of the di-chloro-product rises to 34% while that of the trichloro-product falls to 13.5%. As can be seen from these figures, the process of chlorination is not simple.

At a fixed molar ratio of 2-methylpyridine:steam:chlorine of 1:2:1, the proportion of the three major products varies considerably with change in temperature. The chlorination was carried out in an empty reactor and it was found that, at a temperature within the range 205 to 220° C., the reactor product was composed of 60.5% of the monochloromethyl pyridine, 20.5% of the di-chloro-product and 19% of the trichloro-product, whereas at 240 to 275° C. the proportions were 64.5%, 25.5% and 10.0% respectively. In a further run from 350 to 365° C., the proportions were 77.5%, 9.0% and 13.5%.

In general I have found that the higher the reaction temperature, the greater is the proportion of mono-chlorinated material in the reaction product.

It is obvious that, other things being equal, a larger ratio of chlorine to alkyl heterocycle will result in a high proportion of the higher substituted product. The process can be operated satisfactorily with between 0.1 and 3 moles of chlorine per α-methylene group in the alkyl-heterocycle depending on the product desired. If it is desired to produce the mono-chlorinated product predominantly, the molar ratio of chlorine to alkyl heterocycle should lie between 0.75:1 and 1.75:1. The contact time also has an important influence on the degree of chlorination of the alkyl heterocycle, the product being more highly chlorinated if a longer contact time is used; for example, if a mixture of 4-picoline steam and chlorine, in a molar ratio of 1:20:1, is passed through an empty tube reactor held at 240–270° C. with a contact time of 8 seconds, the main product is 4-trichloromethyl pyridine; if the contact time is reduced to 0.2 to 0.3 second, the main product is 4-monochloromethyl pyridine.

The process according to the invention provides chlorinated-alkyl pyridines and chlorinated-alkyl quinolines in which substantially all the chlorine is in the side-chain. I have not found any instances in which there is more than a small proportion of nuclear chlorination, for example as much as 5% of the chlorine becoming substituted in the nucleus; in by far the majority of cases, the proportion is not even as high as 1%. If the alkyl group of the alkyl heterocycle has more than one carbon in it, we have found that the hydrogen atoms on the α-carbon atom of the alkyl group are replaced by chlorine in preference to those on any other carbon atom. Furthermore, if there is more than one alkyl group on the heterocyclic nucleus, the hydrogens on the α-carbon atom of one alkyl group will be completely replaced before those on the α-atom of any other alkyl group are replaced at all.

The products produced by this process are mixed mono-, di- and higher chlorinated alkyl heterocycles. For this reason it is necessary to separate the components of the product if a pure compound is desired. Methods exist for performing this separation; for example a mixture of the chlorinated 2-methyl pyridines may be separated by extracting the mixture with carbon tetrachloride to remove the trichlorinated material, partially neutralising the remainder of the material, and extracting with diethyl ether to provide a solution of mixed mono- and di-chlorinated methyl pyridines which may be separated by distillation under reduced pressure. Alternatively, the partial neutralisation may be carried out in two stages, to two specific pH values, namely a pH of 1.0 at which the dichloro compound will separate and subsequently to a pH of 4.5 at which the monochloro compound can be extracted from the aqueous solution; in this way a difficult fractional distillation may be avoided.

In general, the extraction process can be carried on either continuously or in batch fashion.

Mono-chlorinated-alkyl heterocycles are generally unstable and discolour rapidly on standing owing to self-quaternisation. If desired the compounds may be stored indefinitely as the hydrochloride, from which the free base is recovered by careful neutralisation.

The following examples show the chlorination of various alkyl pyridines under different reaction conditions:

Example 1

Into a reaction vessel consisting of a silica tube maintained at from 350 to 370° C. a mixture of 1 mole of 2-picoline and 6 moles of steam preheated to 240–260° C. and 1.1 moles of chlorine gas preheated to 180–220° C. were separately pumped. The time of contact of the reactants was 7.9 seconds.

The gases leaving the vessel were condensed and collected in a 2 N solution of hydrochloric acid. This solution was extracted with carbon tetrachloride, and 2-trichloromethyl pyridine distilled from the extract. The raffinate was then treated with aqueous alkali until its pH was 1.0. At this pH 2-dichloromethylpyridine was precipitated with a very small amount of 2-chloro-6-methylpyridine which was present in the reaction product. These were removed by extraction with diethyl ether and were recovered by distillation at a pressure of 4 mm. mercury. Further neutralisation of the raffinate to pH 4.5 afforded 2-monochloromethylpyridine which was extracted from the aqueous solution with diethylether. Removal of the ether gave 2-monochloromethylpyridine in a high state of purity. The residual liquor was treated with alkali to free the unreacted 2-picoline, which was recovered by distillation in steam and recycled directly to the process. The yield of the 2-monochloromethylpyridine, based on 2-picoline consumed during the reaction, is 70%.

Example 2

Into a reaction vesesel consisting of a silica tube packed with silicon carbide lumps maintained at 240–275° C. 3 moles of a mixture of 2-picoline and steam (in a ratio of 1 mole of picoline to 2 moles of steam) preheated to 180–220° C. and 1.1 mole of chlorine gas preheated to 120–140° C. were separately pumped. The time of contact of the reactants was 3.5 seconds. The gases leaving the vessel were treated, and the reaction products were separated, in the same way as described in Example 1.

Example 3

The reactor used in Example 2 was maintained at a temperature of 220–250° C. and by a similar process, but with 4 moles of steam per mole of base and a contact time of 3.4 seconds, 3-picoline was chlorinated to yield predominantly 3-monochloromethylpyridine.

Example 4

Under the same conditions as in Example 3, 2(α-chloroethyl) pyridine was produced as the major product by the chlorination of 2-ethylpyridine.

Example 5

Under the same conditions as in Example 3, 6-methyl-2-mono, -2-di-, and -2-trichloromethylpyridine was produced from 2:6 lutidine. On increasing the amount of chlorine, 2:6 - bis(trichloromethyl)pyridine from 2:6 lutidine was obtained in rather poor yield.

Example 6

The reactor used in Example 2 was maintained at a temperature of 240–265° C.; and into it were pumped separately 5 moles of a mixture of 2-isopropylpyridine and steam (in the ratio of 1 mole of the alkylpyridine to 4 moles of steam) preheated to 180–220° C. and 1.1 moles of chlorine gas preheated to 120–140° C. By a method similar to that used in Example 1, the constituents of the reaction product were separated and 2-(α-methyl-α-chloroethyl) pyridine was obtained. This is a clear liquid, having an odour somewhat similar to that of pyridine, and has a boiling point of 69–70° C. at a pressure of 7 mm./Hg. I believe 2-(α-methyl-α-chloroethyl) pyridine to be a novel compound.

Example 7

By a similar process to that described in Example 2, but using 8 moles of steam per mole of base at a temperature of 230–260° C. and with a contact time of 3.8 seconds, 4-picoline was chlorinated. The major product from this reaction was 4-trichloromethylpyridine.

Example 8

Using the reactor described in Example 1, and maintaining it at 290–310° C., a mixture of 3-picoline and steam in a molar ratio of 1:4 was reacted with 1.1 mole chlorine. The contact time was 2.8 seconds, and the product consisted predominantly of 3-monochloromethyl pyridine.

Example 9

Using the reactor described in Example 1, and maintaining it at 308–330° C. a mixture of 4-picoline and steam in a molar ratio of 1:20 was reacted with 1.1 mole chlorine. The contact time was 0.2–0.3 second. The predominant product was 4-monochloromethylpyridine.

Example 10

Using the reactor described in Example 1, 4-benzylpyridine was chlorinated at a temperature of 320–360° C. using a ratio of base to water of 1:10 and a contact time of 2.4 seconds. Chloro, phenyl, (4-pyridyl) methane was isolated from the reaction mixture.

Example 11

Under the same conditions as in Example 10, 5-ethyl-2-monochloromethylpyridine was produced from 5-ethyl 2-methylpyridine.

Example 12

Under the same conditions as in Example 10, 4-(α-chloroethyl)pyridine was produced from 4-ethylpyridine.

Example 13

Using the reactor described in Example 1 and maintaining it at 340–350° C., a mixture of 2-methyl quinoline and steam in a molar ratio of 1:10 was reacted with 1.1 moles of chlorine. 2-mono- and dichloromethyl quinolines, together with a little 8-chloro-2-methyl quinoline, were isolated from the reaction mixture.

Example 14

With the reactor described in Example 1 and maintained at 350–370° C., a mixture of 4-methyl quinoline and steam in a molar ratio of 1:10 was reacted with 1.1 moles of chlorine, 4-mono and 4-dichloromethyl quinolines were isolated from the reaction mixture.

Example 15

Into an empty tube reactor maintained at 280–300° C. were separately pumped a mixture of 1 mole of 2-picoline and 2 moles of carbon tetrachloride, preheated to 220–240° C., and 1.1 moles of chlorine gas preheated to 180–220° C. The contact time of the reactants was 3.6 seconds. 2 - mono and 2 - dichloromethylpyridine were isolated from the reaction mixture.

I claim:

1. A process for the preparation of chlorinated-lower alkyl pyridines having substantially all of the chlorine substituent located in the alkyl side chain, which comprises reacting a lower alkyl pyridine in the vapor phase with gaseous chlorine at an elevated temperature in the range of from about 140° C. to about 500° C., in the presence of an inert diluent, the contact time of the reactants and products at the elevated temperature ranging from about 0.1 second to about 60 seconds.

2. A process according to claim 1 in which the reaction is carried out in a packed reactor at a temperature between 180° C. and 350° C.

3. A process according to claim 1 in which the reaction is carried out in an unpacked reactor at a temperature between 140° C. and 500° C.

4. A process according to claim 2 carried out at a temperature between 220° C. and 280° C.

5. A process according to claim 1 wherein the inert diluent is steam.

6. A process according to claim 1 wherein at least 0.1 mole of diluent is used per mole of said alkyl pyridine.

7. A process according to claim 1 wherein the molar ratio of chlorine to alpha-methylene group in said alkyl pyridine is between 0.1:1 and 3:1.

8. A process according to claim 7 for the production of a product that is predominantly mono-chlorinated wherein the molar ratito of chlorine to alpha-methylene group in said alkyl pyridine is from 0.75:1 to 1.75:1.

References Cited

UNITED STATES PATENTS

| | | | |
|---|---|---|---|
| 2,585,091 | 2/1952 | Clarke | 260—694 X |
| 2,679,453 | 5/1954 | Brett et al. | 260—290 X |
| 3,153,044 | 10/1964 | Zaslowsky | 260—290 |
| 3,251,848 | 5/1966 | Taplin | 260—290 |

NICHOLAS S. RIZZO, *Primary Examiner.*

ALEX MAZEL, *Assistant Examiner.*